Nov. 7, 1933.  D. McPHERSON  1,933,919
HIGH PRESSURE HOSE CONTROL APPLIANCE
Filed March 28, 1932  2 Sheets-Sheet 1
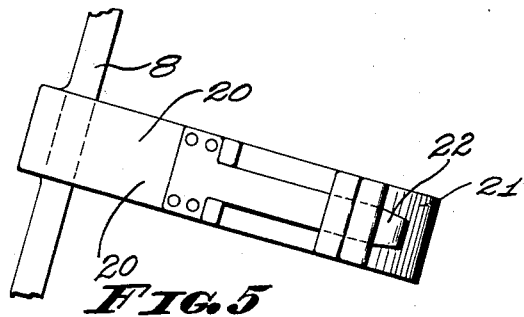
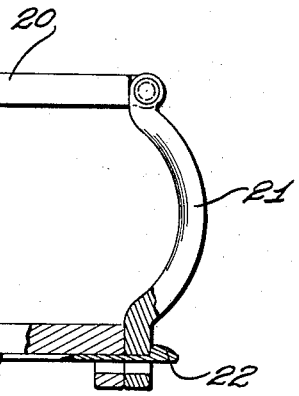
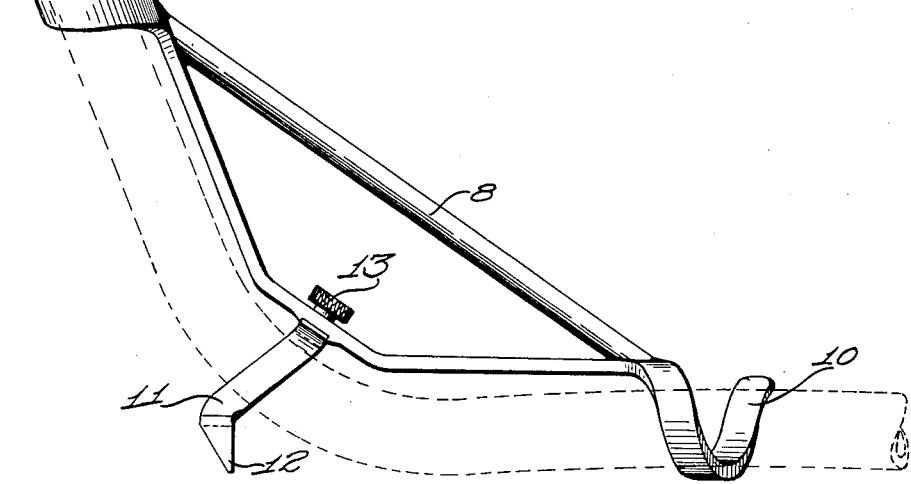
Duncan McPherson Inventor

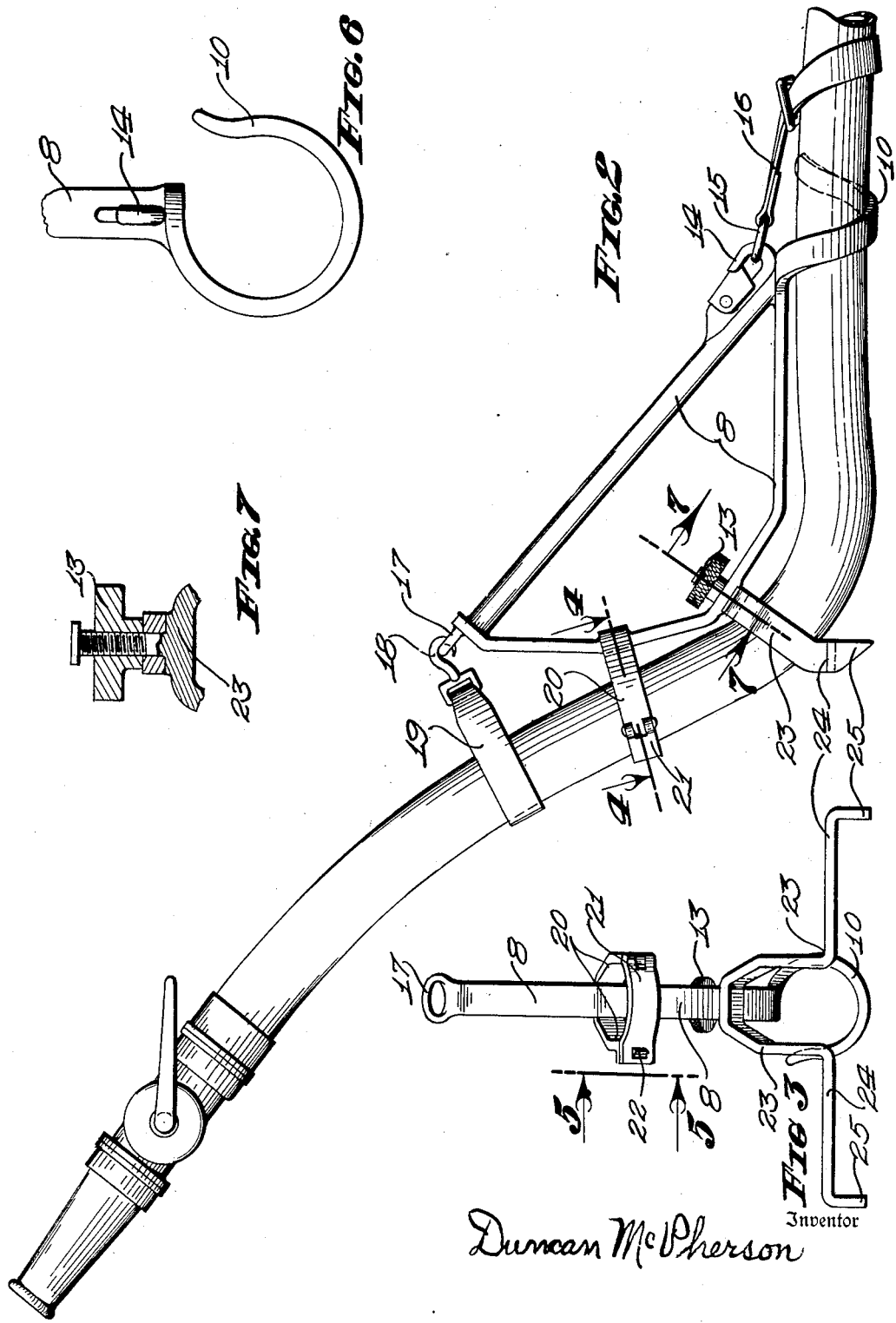

Patented Nov. 7, 1933

1,933,919

UNITED STATES PATENT OFFICE 1,933,919

HIGH PRESSURE HOSE CONTROL APPLIANCE

Duncan McPherson, San Diego, Calif.

Application March 28, 1932. Serial No. 601,595

12 Claims. (Cl. 299—111)

This invention relates to a device for the better control of the nozzle end of a fire hose, or any hose carrying water or any fluid stream under high pressure, such device being a metal base or shoe, into which the hose, at a point within a few feet of the nozzle end thereof, can be warped, and forced to retain a rigid curved position therein.

Designed to rest on the ground, as a shoe to the hose, it is provided with feet or points thereunder for gripping the ground under the force of the back pressure.

Great water pressures incident to modern fire fighting conditions cause so much back pressure at the nozzle end of the hose line that considerable man power is required to resist the torsion and backward movement of the hose.

The main seat of the trouble is where the hose line leaves the ground. The danger point is in this curve upward toward the nozzle. With every movement of the nozzle the line of back pressure is deflected and this hose bend is kept in a constant unstable condition, a torsional movement setting in with every effort to straighten itself.

No one heretofore seems to have discovered the fact if a hose, at this bend, is locked in a fixed curve and restrained in its tendency to straighten itself that the whole problem of handling a high pressure stream is greatly reduced and most of the danger eliminated.

My endeavor has been to devise a simple means of warping the hose at the said bend to a fixed curvilinear position, into a form to receive it, without necessarily affecting the pliability of that part of the hose immediately adjacent to the nozzle.

Of several different structures for accomplishing this which I have devised the one shown in the drawings is probably the simplest. For in this device the means used to secure the hose in the curved position is the tendency, itself, of the hose, to resume a straightened position, this tendency of the hose to straighten itself out increasing with the pressure of the stream and exerting pressure against the three or more points of resistance sufficient to lock the hose in the form against slippage from the back pressure.

In experimental practice it has been found that this device will stand of itself, even on a smooth pavement, no operator touching it, a high pressure stream causing the back pressure to be deflected downward and to lock the device firmly to the ground. And the free end of the hose will not slip back when so left to itself.

This deflection of the back pressure downward is relied upon rather than the weight of the structure or the spread of the legs or the sharp points under the legs to cause the hose to keep a stable position on the ground.

There is a particular bend, better than another, varying with the hose size and the pressure and nozzle diameter which most effectively converts this back pressure into down pressure and so best stabilizes the hose and device in position.

There is a theoretical bend at which the hose, under any given condition of size and pressure and nozzle reaction, would stand of itself in a state of balance or equilibrium, without any holding device.

In the construction of a device best calculated, under varying conditions, to hold the hose in a bend at which the hose depends least for support, the device I have made immobilizes the hose in a bend approximate to that at which a hose would stand by itself, without a supporting device, under the several reactions of the stream and the weight of the supported parts.

When the stream is manually directed downwardly the pressure and weight of the operator on the nozzle and flexible portion of hose counteracts the tendency of the device to lift off the ground under the upwardly directed nozzle reaction.

In my invention of a hose nozzle handler (Patent No. 1,876,718, issued September 13, 1932) I have provided a nozzle control by means of a handle extension which deflects the back pressure to the ground in front of the operator, equilibrating the upstanding portion of hose at a point neutral to the counteracting forces of the stream.

Under all usual pressures incident to a mobile hose line this handler operates successfully, but with the larger nozzle diameters and greater pressures, where mobility is not essential or customary, the rigidity of the hose becomes so great as not to be easily bent or held in a bent position.

Under these conditions, and incidentally to add to and extend the usefulness of my nozzle handler, I have invented this hose shoe, which can be used with great advantage on any high pressure hose line, whether a hose handler is used or not. This hose shoe is unique in its structure and purpose, can be built in a diversity of forms, is simple and inexpensive and will more safely and effectively deflect the back pressure downward to the ground than much of the expensive heavy metal equipment now in fire department use. It can be purchased by departments which cannot now afford to buy the present equipment and firemen will be relieved from the constant danger under which they now man heavy pressure streams.

For operation of streams of unusual volume and pressure, where two or more standard lines and Siamesed into one, this device affords a practical use. For with a four foot length of larger hose, directly connecting the nozzle with the Siamese, this short length being adjusted into a hose shoe, a safe and inexpensive apparatus is now available.

There is a freedom of movement in that short portion of hose extending upward from the shoe and this permits a nozzle movement which is not possible in any known hose holder or hose support.

Reference is hereby made to the drawings in which similar numerals of designation refer to similar parts throughout the several views.

Figure 1 is a side elevation of a simplified form of a device embodying my invention; Fig. 2 is a view of a modification of my improved apparatus illustrating my invention in one of its preferred forms showing the hose in operative position; Fig. 3 is an end view of the apparatus shown in Fig. 2 showing the hose removed looking at the same from the front in the direction of the arrows 7—7 of Fig. 2; Fig. 4 is a section on line 4—4 of Fig. 2 looking in the direction of the arrows; Fig. 5 is a view of the detail shown in Fig. 4 looking at the same in the direction of the arrows 5—5 of Fig. 3; Fig. 6 is a view of the rear hook of my improved apparatus and Fig. 7 is a section on line 7—7 of Figure 2 of the set screw employed for pivotally securing the legs to my said apparatus.

Referring to the drawings,—in the simplified form shown in Figure 1 the frame 8 is provided at the ends thereof with the hooks or arms 9 and 10, shaped to receive and hold a length of hose bent in the manner shown in dotted lines, legs 11 being pivotally secured to said frame by the set screw 13 and being provided with pointed ends 12 for the purpose of securing firm contact with the ground.

To apply the shoe the firemen proceed as usual to lay out the hose line, turning the water into the line to adjust it to the ground and the incident rotation, with the nozzle shut-off closed.

The ground end is then hooked over the hose and the legs dropped astride of the hose. The nozzle is then lifted and bent back to force the charged hose into the upper hook.

This simple procedure will firmly lock the hose in the shoe and the shut-off can be immediately opened. There is no possibility of the hose escaping from the position into which it has been warped, and little possibility of any slippage in the shoe although no special means of fastening the hose at either end of the frame has been made.

With the closing of the shut-off in the nozzle for a brief period the hose line and hose shoe can be quickly shifted in position.

Referring to the modification of my apparatus shown in Fig. 2 I construct the frame 8 with a spring clasp 14 for the purpose of securing a ring 15 connected with a strap 16 surrounding the portion of the hose adjacent to the rear hook 10.

To the top portion of the frame 8 is welded the ring 17 to which is secured the hook 18 attached to the strap 19 which encircles a portion of the hose loosely a short distance from the nozzle.

For the purpose of firmly securing and holding the hose in the position shown I provide the shackle 20 which is firmly secured to the upright portion of the frame 8 and is provided with a circular arm 21 having one end hinged thereto and the other end being provided with a lock 22.

To the lower portion of the frame 8 I mount the yoke 23 which is pivotally secured thereto by the set screw 13 the said yoke being provided at the lower ends thereof with the legs 24 which each terminate in a pointed foot 25 for the purpose of making secure contact with the ground.

With my improved apparatus I use the strap 19 and the shackle 20 to hold the hose upward instead of the hook 9 of my simplified apparatus. Neither strap nor shackle are tight enough to bind the hose in any way. The strap 19 need not be used under certain conditions, but the downward pressure of the nozzleman against the hose and strap tends greatly to the stability of the hose shoe, as the nozzleman moves the direction of the nozzle at various angles, the line of backwardly deflected nozzle reaction being counterbalanced by his pressure downward in the opposite direction. A further advantage is that under pressure of the fireman, downward or in any direction, there is no tendency of the hose to crimp, as there is where it is bended over one point of contact at the upper end.

The set screw 13 is used so that when the hose shoe is not in use the yoke and spreading legs can be turned on the frame 8 to a position which will simplify the carrying of the apparatus on the running board of the fire engine.

The use of the rear hose strap 16 prevents any possibility of the hose working its way out of the shoe, under any manipulation of the nozzle, since it tightens under any back movement of the hose.

Safety as well as simplicity is an outstanding feature of my invention. Hose holders and tripods and other supporters now in use are constructed to provide secure attachment to the nozzle structure, but there is no safety in their use for this reason,—the danger point is at the ground bend and it has been overlooked. The more dangerous torsional hose twists do not arise, as generally supposed, in the upper bend of the hose adjacent to the nozzle.

A short free end of hose, sufficient to act as a hinge to permit manual movement of the nozzle in any direction, left between my device and the nozzle, will have no torsion whatever, and one man can operate a standard 2½ inch hose line under any pressure which will not burst the hose.

Experiment has shown that with the nozzle open it is safe to carry the hose with less than the usual man power for any given pressure, my device attached thereto being used as a holder. The locked curve not only eliminates torsional twist at that point but puts the nozzle in an upwardly pointed position usual to most fire fighting use, while the holder is being carried in a position natural to the men. There are numerous advantages in its use as a holder.

While I have described my invention with particular reference to the device shown in the accompanying drawings I by no means desire so to limit the scope of my invention, it being obvious that various changes and modifications could be made without departing from the spirit and purpose of my invention.

What I claim and desire to secure by Letters Patent is:

1. In a high pressure fire hose appliance for manual operation of a nozzle and flexible hose, the combination of a nozzle, a section of hose bending upwardly from the ground, a flexible portion of hose between the bend and the nozzle, with a means consisting of a metallic frame or form having three points of contact with said hose bend for holding said hose bend to the ground against the torsional movement and nozzle reaction to permit the stream being manually operated in the desired direction, said metallic means being provided with downwardly projecting spikes for attaching said means to the ground.

2. In a high pressure fire hose appliance, a hose shoe, comprising a body member of metal adapted to rest on the ground, such body member being provided with means for bending the hose near the nozzle end thereof and holding such bend in a fixed curve against torsion and deflecting the back pressure downward into said bended hose and into said holding means, said back pressure forcing the said hose bend into firm contact with the ground.

3. In a high pressure fire hose appliance, a hose shoe, comprising a body member of metal adapted in form to receive a section of filled hose, and to bend the same where the hose leaves the ground and curves upward toward the nozzle, said body member having securing means for holding and locking the hose in a fixed bent position against torsion and the straightening tendency of the stream, combined with legs under such body member for contact with the ground and being so placed that such body member will support said bended hose in an arc curving upward from the ground, said legs being pointed to grip the ground under force of the downwardly deflected back pressure.

4. A method of manual operation of a high pressure stream issuing from the nozzle of a fire hose to obviate the necessity of manual resistance to the nozzle reaction, consisting in bending the hose into a curve extending upwardly from the ground about three feet back from the nozzle, and locking said hose bend rigidly in such curved position during operative employment, the character of said curve being approximately that at which the moments of the several reactions of the stream and the weight of the supported parts equilibrate, a section of hose of about one foot in length freely extending upward and beyond the rigidly locked hose bend to the nozzle.

5. A method of manual operation of a high pressure stream issuing from the nozzle of a fire hose of standard large size diameter to obviate the necessity of manual resistance to the nozzle reaction, consisting in bending the hose into a curve about three feet back from the nozzle, and immobilizing said hose bend rigidly in such curved position during operative employment, said hose being so positioned as to deflect the several reactions of the stream downward so that at the point where the hose leaves the ground there is a balancing of the moments of the several reactions and the weight and pressure exerted by the operator on the supported parts, and allowing for a section of hose of about one foot in length to freely extend beyond said immobilized bend to the nozzle.

6. In a high pressure fire hose appliance for manual operation of a nozzle and flexible hose, the combination of a nozzle, a section of hose bent upwardly from the ground, a flexible portion of hose between the bend and the nozzle, with a means for immobilizing said bend against the counteracting pressures of the stream passing through said hose, said immobilization being of said bend but not of said portion between the bend and the nozzle, said immobilizing means holding said hose in such an arc curving upward as to produce such a resultant of the several reactions and the weight of the liquid that the hose will be in a state of substantially stable equilibrium when resting on the ground.

7. In a high pressure fire hose appliance for manual operation of a nozzle and flexible hose, the combination of a nozzle, a section of hose bent upwardly from the ground, a flexible portion of hose between the bend and the nozzle, with a means for immobilizing said bend against the counteracting pressures of the stream passing through said hose, said immobilization being back of but not at the nozzle, said immobilizing means forcing said hose into substantially that curve where the moments of the several reactions of the stream and the weight of the supported parts equilibrate.

8. In the manual operation of a high pressure stream, a method of handling a flexible hose for manual direction of the nozzle which consists of curving a portion of hose near the nozzle upwardly from the ground, immobilizing said curved portion of hose in this position during its operative employment, and directing the stream by bending the portion of hose between the nozzle and the immobilized portion of the hose to bring the nozzle into the desired direction, said curve being of a nature to produce such a resultant of the several reactions and the weight of the liquid that the hose will be in a state of substantially stable equilibrium when in operative position.

9. In the manual operation of a high pressure stream, a method of handling a flexible hose for manual direction of the nozzle which consists of curving a portion of hose near the nozzle upwardly from the ground, immobilizing said curved portion of hose in this position during its operative employment, and directing the stream by bending the portion of hose between the nozzle and the immobilized portion of the hose to bring the nozzle into the desired direction, said curve being of a nature to produce such a resultant of the several reactions and the weight of the liquid that the hose will be in a state of substantially stable equilibrium when resting on the ground.

10. In the manual operation of a high pressure stream, a method of handling a flexible hose for manual direction of the nozzle which consists of curving a portion of hose near the nozzle upwardly at an obtuse angle from the ground, immobilizing said curved portion of hose in this position during its operative employment, and directing the stream by bending the portion of hose between the nozzle and the immobilized portion of the hose to bring the nozzle into the desired direction, said curve being of a nature to produce such a resultant of the several reactions and the weight of the liquid that the hose will be in a state of substantially stable equilibrium when resting on the ground.

11. In the manual operation of a high pressure stream, a method of handling a flexible hose for manual direction of the nozzle which consists of curving a portion of hose near the nozzle upwardly from the ground, immobilizing said curved portion of hose in this position during its operative employment, and directing the stream by bending the portion of hose between the nozzle and the immobilized portion of hose to bring the nozzle into the desired direction, said curve being of a nature to produce such a resultant of the several reactions and the weight of the liquid that the hose will be in a state of substantially stable equilibrium when resting on the ground, said curve being so positioned as to secure stable contact of the hose with the ground by reason of the nozzle reaction.

12. In the manual operation of a high pressure stream, a method of handling a flexible hose for manual direction of the nozzle which consists of curving a portion of hose near the nozzle upwardly from the ground, immobilizing said curved portion of hose in this position during its operative employment, leaving a portion of the hose adjacent to the nozzle above said curved portion free to permit manual movement thereof, and directing the stream by bending the portion of hose between the nozzle and the immobilized portion of the hose to bring the nozzle into the desired direction, said curve being of a nature to produce such a resultant of the several reactions and the weight of the liquid that the hose will be in a state of substantially stable equilibrium when resting on the ground.

DUNCAN McPHERSON.